United States Patent
Saini et al.

(12) 
(10) Patent No.: US 12,071,968 B2
(45) Date of Patent: Aug. 27, 2024

(54) REUSABLE RELEASABLE RESTRAINT FOR EVACUATION ASSEMBLIES

(71) Applicant: Goodrich Corporation, Charlotte, NC (US)

(72) Inventors: Mohinder Saini, Bangalore (IN); Petchi Subramanian, Bangalore (IN); Bharath Marappan, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 1060 days.

(21) Appl. No.: 16/983,130

(22) Filed: Aug. 3, 2020

(65) Prior Publication Data

US 2021/0324896 A1    Oct. 21, 2021

(30) Foreign Application Priority Data

Apr. 16, 2020 (IN) .............................. 202041016490

(51) Int. Cl.
*F16B 19/00*    (2006.01)
*B64D 25/14*    (2006.01)

(52) U.S. Cl.
CPC .............. *F16B 19/00* (2013.01); *B64D 25/14* (2013.01)

(58) Field of Classification Search
CPC ...... F16B 19/00; F16B 19/109; F16B 45/024; B64D 25/14; Y10T 24/45696; Y10T 24/45702; Y10T 24/4571
See application file for complete search history.

(56) References Cited

U.S. PATENT DOCUMENTS

| | | | |
|---|---|---|---|
| 686,165 A * | 11/1901 | Tamm | A41F 3/00 |
| 3,944,023 A | 3/1976 | Fisher | |
| 4,567,977 A | 2/1986 | Fisher | |
| 6,168,344 B1 * | 1/2001 | Aguirre, Jr. | A01K 27/005 403/DIG. 4 |
| 10,457,408 B2 | 10/2019 | Haynes et al. | |
| 10,556,698 B2 * | 2/2020 | Volny | B63B 27/14 |

FOREIGN PATENT DOCUMENTS

FR    2237513 A1 *    2/1975    ........... B60R 22/324

* cited by examiner

*Primary Examiner* — Brian D Mattei
*Assistant Examiner* — Jacob G Sweeney
(74) *Attorney, Agent, or Firm* — SNELL & WILMER L.L.P.

(57) ABSTRACT

A releasable restraint may comprise a bracket and a puller removably coupled to the bracket. A first tube portion and a second tube portion may be rotatably coupled to the puller. A torsion spring may be configured to bias the first tube portion in a first circumferential direction and the second tube portion in a second, opposite circumferential direction.

7 Claims, 8 Drawing Sheets

REUSABLE RELEASABLE RESTRAINT FOR EVACUATION ASSEMBLIES

CROSS REFERENCE TO RELATED APPLICATIONS

This application claims priority to and the benefit of India Patent Application No. 202041016490 filed Apr. 16, 2020 and entitled "REUSABLE RELEASABLE RESTRAINT FOR EVACUATION ASSEMBLIES," which is hereby incorporated by reference in its entirety for all purposes.

FIELD

The present disclosure relates to releasable restraints, and more specifically to reusable releasable restraint devices for evacuation assemblies.

BACKGROUND

Evacuation assemblies may include an inflatable slide that helps passengers disembark from an aircraft in the event of an emergency or other evacuation event. The slides may deploy from a door sill or a side of the aircraft fuselage. The deployment and unfolding of the slide may be controlled by releasable restraints placed throughout the length of the slide. The releasable restraints typically include a shear pin, which shears (i.e., breaks) in response to an internal slide pressure. In this regard, the shear pin and/or the releasable restraints are generally single use.

SUMMARY

A releasable restraint is disclosed herein. In accordance with various embodiments, the releasable restraint may comprise a bracket and a first pin extending between a first flange of the bracket and a second flange of the bracket. A second pin may extend between a third flange of the bracket and a fourth flange of the bracket. A puller may be removably coupled to the bracket. A first tube portion and a second tube portion may be rotatably coupled to the puller.

In various embodiments, a torsion spring may be configured to bias the first tube portion toward the first pin and to bias the second tube portion toward the second pin. In various embodiments, a third pin may be coupled to the puller. The first tube portion and the second tube portion may be configured to rotate about the third pin.

In various embodiments, the torsion spring may be configured to bias the first tube portion in a first circumferential direction about the third pin, and to bias the second tube portion in a second circumferential direction about the third pin. The second circumferential direction may be opposite the first circumferential direction.

In various embodiments, the puller may include a first puller flange extending from an interior surface of the puller and a second puller flange extending from the interior surface of the puller. The third pin may extend between the first puller flange and the second puller flange.

In various embodiments, in a secured position, the first puller flange may be located in a first groove defined by the first flange, the third flange, and the interior surface of the bracket. In the secured position, the second puller flange may be located in a second groove defined by the second flange, the fourth flange, and the interior surface of the bracket.

In various embodiments, the torsion spring may be located in a spring channel defined by the first tube portion and the second tube portion. In various embodiments, an interior end of the second tube portion may be configured to receive an interior end of the first tube portion. The third pin may be located through the interior end of the first tube portion and the interior end of the second tube portion.

An evacuation slide is also disclosed herein. In accordance with various embodiments, the evacuation slide may comprise a sliding surface and an underside surface opposite the sliding surface. A first strap may be coupled to at least one of the sliding surface or the underside surface. A second strap may be coupled to at least one of the sliding surface or the underside surface. A first releasable restraint may be coupled between the first strap and the second strap. The first releasable restraint may comprise a first bracket coupled to the first strap, a first pin extending between a first flange of the first bracket and a second flange of the first bracket, a second pin extending between a third flange of the first bracket and a fourth flange of the first bracket, a first puller coupled to the second strap, a first tube portion rotatably coupled to the first puller, and a second tube portion rotatably coupled to the first puller.

In various embodiments, the first releasable restraint may further comprise a first torsion spring configured to bias the first tube portion of the first releasable restraint toward the first pin of the first releasable restraint, and to bias the second tube portion of the first releasable restraint toward the second pin of the first releasable restraint.

In various embodiments, a third pin may be coupled to the first puller. The first tube portion and the second tube portion may be configured to rotate about the third pin.

In various embodiments, a third strap may be coupled to at least one of the sliding surface or the underside surface, and a fourth strap may be coupled to at least one of the sliding surface or the underside surface. A second releasable restraint may be coupled between the third strap and the fourth strap. The second releasable restraint may comprise a second bracket coupled to the third strap, a first restraint pin extending between a first flange of the second bracket and a second flange of the second bracket, a second restraint pin extending between a third flange of the second bracket and a fourth flange of the second bracket, a second puller coupled to the fourth strap, a first restraint tube portion rotatably coupled to the second puller, and a second restraint tube portion rotatably coupled to the second puller.

In various embodiments, the second releasable restraint may further comprise a second torsion spring configured to bias the first restraint tube portion of the second releasable restraint toward the first restraint pin of the second releasable restraint, and configured to bias the second restraint tube portion of the second releasable restraint toward the second restraint pin of the second releasable restraint.

In various embodiments, a distance between the first pin of the first releasable restraint and the second pin of the first releasable restraint may be less than a distance between the first restraint pin of the second releasable restraint and the second restraint pin of the second releasable restraint. In various embodiments, a spring constant of the second torsion spring may be greater than a spring constant of the first torsion spring.

In various embodiments, the first strap may be coupled closer to a head end of the evacuation slide as compared to the third strap, and at least one of a distance between the first pin of the first releasable restraint and the second pin of the first releasable restraint may be less than a distance between the first restraint pin of the second releasable restraint and the second restraint pin of the second releasable restraint or a spring constant of the second torsion spring may be greater than a spring constant of the first torsion spring.

A releasable restraint, in accordance with various embodiments, may comprise a bracket and a puller removably coupled to the bracket. A first tube portion may be rotatably coupled to the puller. A second tube portion may be rotatably coupled to the puller. A torsion spring may be configured to bias the first tube portion in a first circumferential direction and the second tube portion in a second circumferential direction opposite the first circumferential direction.

In various embodiments, a first pin may be coupled to the bracket. The first tube portion may be located between an internal surface of the bracket and the first pin. A second pin may be coupled to the bracket. The second tube portion may be located between the internal surface of the bracket and the second pin.

In various embodiments, the first pin may generate a first interference with the first tube portion. The first interference may be configured to limit rotation of the first tube portion in the first circumferential direction. The second pin may generate a second interference with the second tube portion. The second interference may be configured to limit rotation of the second tube portion in the second circumferential direction.

In various embodiments, a third pin may be located through the puller, the torsion spring, the first tube portion, and the second tube portion.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

Releasable restraints, as disclosed herein, may aid in controlling inflation and deployment of evacuation slides. In accordance with various embodiments, the releasable restraints may be configured to separate or decouple in response to an increased internal slide pressure. After deployment, the separated pieces of the releasable restraint may be re-attached to one another such that the same releasable restraint can be used multiple times. In this regard, the releasable restraints, described herein, are reusable. Reusable releasable restraints may provide cost saving, particularly, with regard to slide testing and certification, wherein multiple deployments of an evacuation slide are performed.

Figure 1:
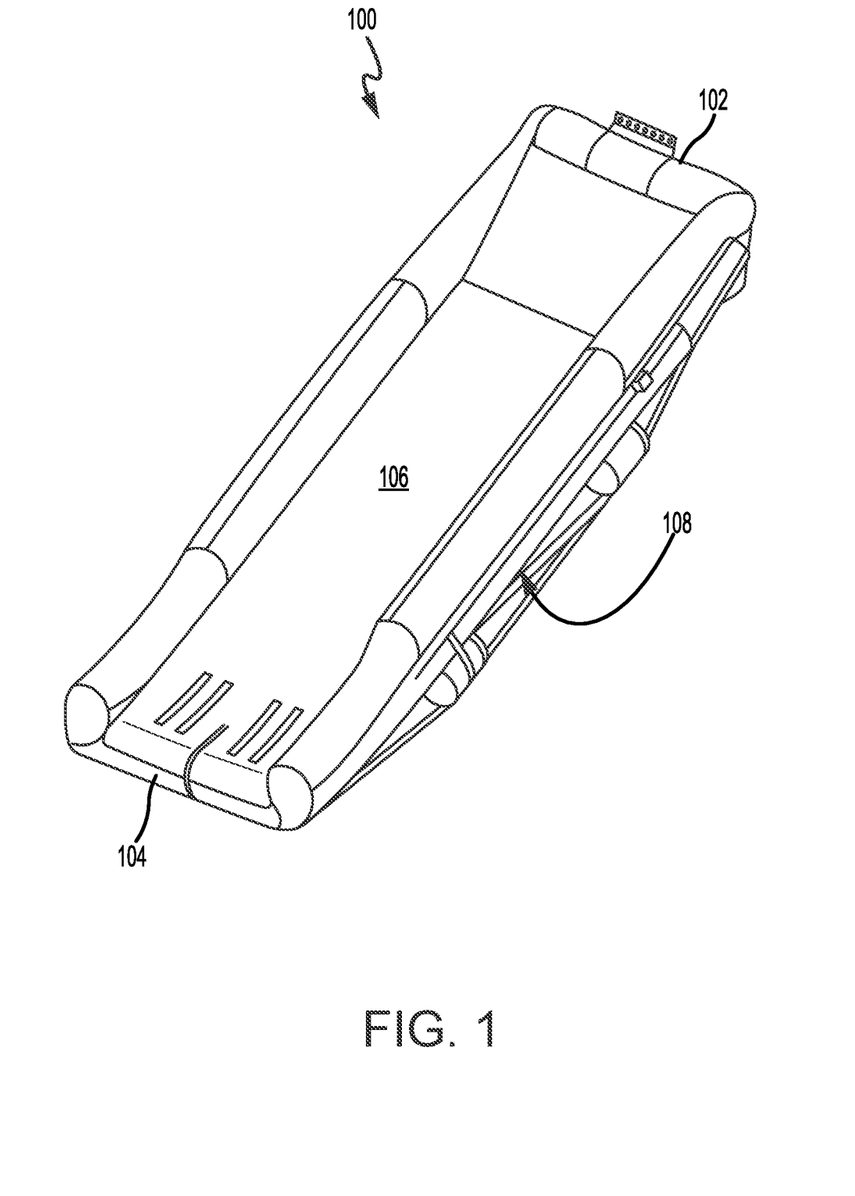
FIG. 1 illustrates an evacuation slide in a deployed position, in accordance with various embodiments.

With reference to FIG. 1, an evacuation slide 100 is illustrated, in accordance with various embodiments. Evacuation slide 100 may deploy from an aircraft, such as from, for example, an aircraft fuselage or aircraft wing. Evacuation slide 100 may comprise a head end 102 and a toe end 104 opposite head end 102. Head end 102 may be coupled to an aircraft. Evacuation slide 100 may comprise a sliding surface 106 and an underside surface 108 that is opposite sliding surface 106. Toe end 104 of evacuation slide 100 may be configured to contact an exit surface in response to evacuation slide 100 being deployed. Evacuation slide 100 may be an inflatable slide. FIG. 1 illustrates evacuation slide 100 in an inflated or "deployed" position. Evacuation slide 100 may comprise a single lane slide, a dual lane slide, or any number of lanes.

Figure 2A:
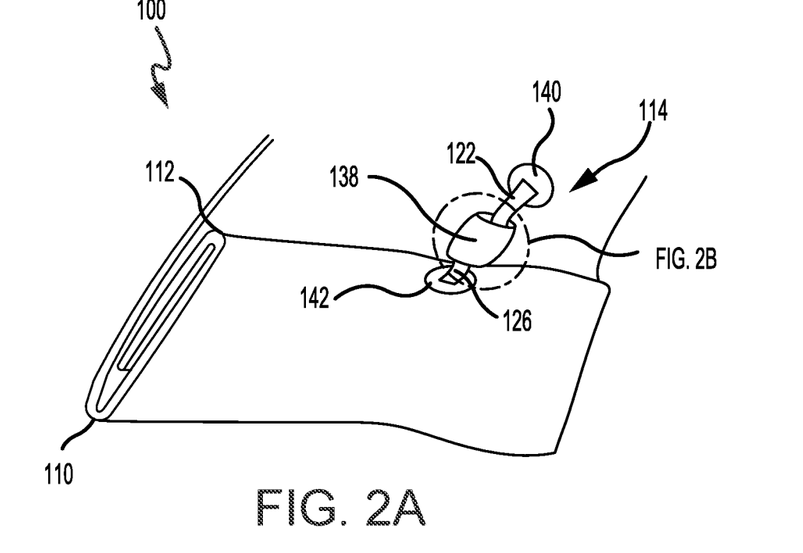
FIGS. 2A and 2B illustrate a releasable restraint retaining an evacuation slide in a folded, or "stowed," position, in accordance with various embodiments.
Figure 2B:
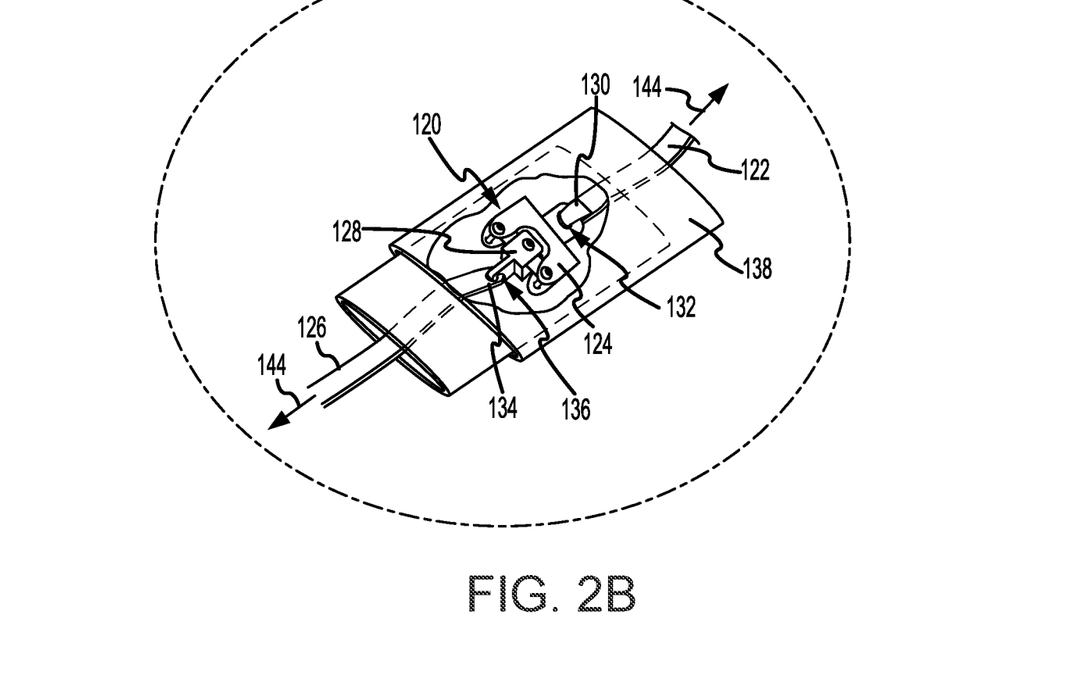

With reference to FIGS. 2A and 2B, evacuation slide 100 is illustrated in a stowed position. When evacuation slide 100 is in the stowed position, evacuation slide 100 may include one or more folds, such as first fold 110 and second fold 112. Evacuation slide 100 may include a deployment assembly 114. Deployment assembly 114 may aid in a staged deployment of evacuation slide 100. Deployment assembly 114 includes one or more releasable restraint(s) 120 (FIG. 2B). Releasable restraint 120 may aid in the staged deployment of evacuation slide 100 by maintaining first fold 110 and/or second fold 112. In accordance with various embodiments, evacuation slide 100 may unfold (i.e., deploy) in response to separation of releasable restraint 120.

In various embodiments, releasable restraint 120 may be configured to separate in response to an internal pressure of evacuation slide 100 exceeding a threshold pressure. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Releasable restraint 120 may maintain evacuation slide 100 in the folded position until the internal pressure has increased to greater than a predetermined threshold pressure. Releasable restraint 120 may separate in response to the internal pressure of evacuation slide 100 being greater than the predetermined threshold pressure. Evacuation slide 100 may unfold in response to releasable restraint 120 separating.

In various embodiments, deployment assembly 114 may include a first strap 122 coupled a bracket 124 of releasable restraint 120 and a second strap 126 coupled to a puller 128 of releasable restraint 120. First and second straps 122, 126 may comprise rope, tape, ribbon, webbing, or any other desired material. An end 130 of first strap 122 may be located through an opening 132 defined by bracket 124. An end 134 of second strap 126 may be located through an opening 136 defined by puller 128. A cover 138 may surround releasable restraint 120. Cover 138 may comprise a fabric. For example, cover 138 may comprise nylon, ballistic nylon, polypropylene, polyester, cotton, or other desired material.

First and second straps 122, 126 may each be coupled to evacuation slide 100. First strap 122 may be coupled to a first portion 140 of evacuation slide 100. Second strap 126 may be coupled to a second portion 142 of evacuation slide 100. In various embodiments, second portion 142 is closer to toe end 104 (with momentary reference to FIG. 1) of evacuation slide 100 as compared to first portion 140. In various embodiments, first portion 140 may be located on sliding surface 106 (with momentary reference to FIG. 1) and second portion 142 may be located on underside surface 108 (with momentary reference to FIG. 1). During inflation of evacuation slide 100, the increasing internal pressure of evacuation slide 100 tends to cause first and second straps 122, 126 to translate away from one another, thereby causing a force 144 in opposing directions to be applied to releasable restraint 120. As described in further detail below, releasable restraint 120 is configured to decouple or separate in response to the force 144 applied by first and second straps 122, 126 exceeding a predetermine threshold force (i.e., in response to the internal pressure of evacuation slide 100 exceeding a predetermined threshold pressure).

Figure 3A:
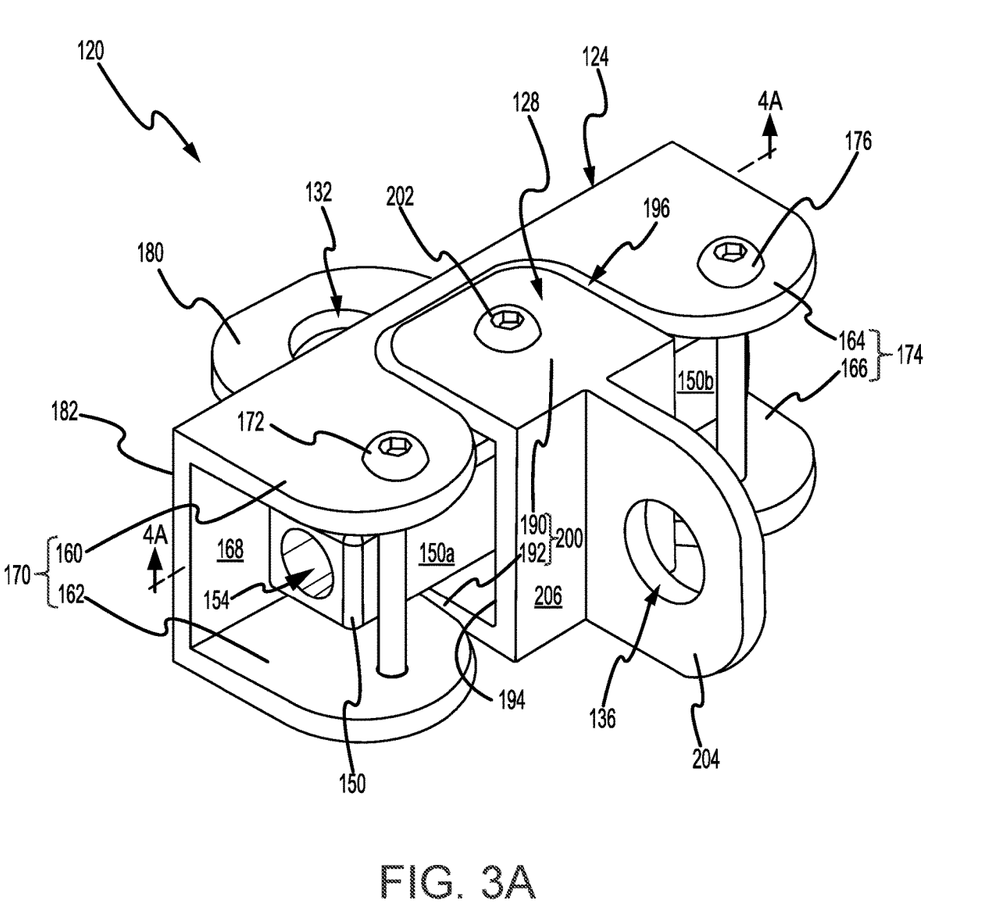
FIGS. 3A and 3B illustrate a perspective view and an assembly view, respectively, of a releasable restraint, in accordance with various embodiments.
Figure 3B:
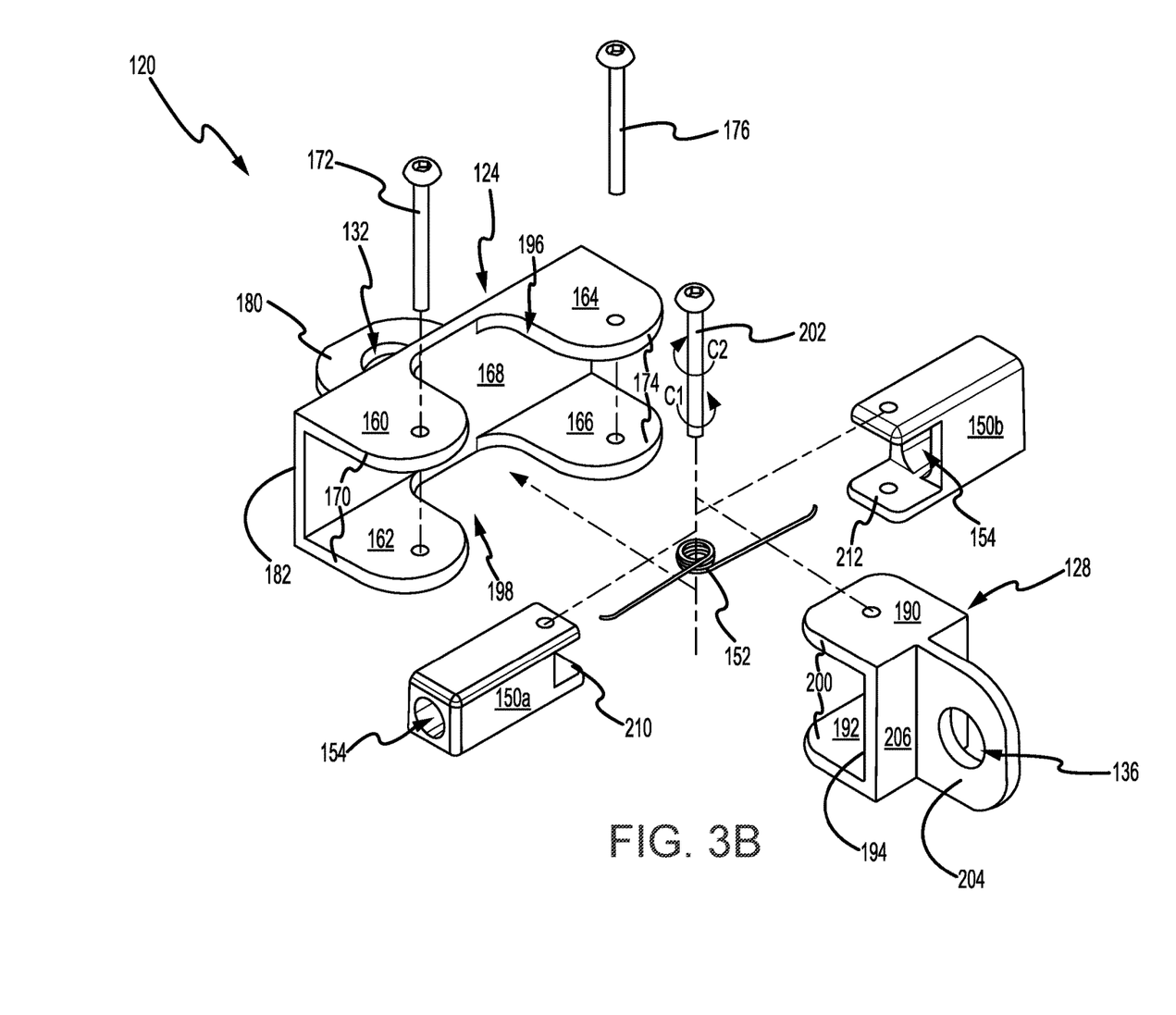

With reference to FIGS. 3A and 3B, a perspective view and an assembly view, respectively, of releasable restraint 120 are illustrated. In accordance with various embodiments, releasable restraint 120 includes bracket 124, puller 128, a tube 150, and a torsion spring 152. Tube 150 may include a first tube portion 150a and a second tube portion 150b (also referred to as a first restraint tube portion and a second restraint tube portion, respectively). Tube 150 (i.e., first tube portion 150a and second tube portion 150b) defines a spring channel 154. Torsion spring 152 is located in spring channel 154.

Bracket 124 includes a first flange 160, a second flange 162, a third flange 164 and a fourth flange 166 (collectively referred to as flanges 160, 162, 164, 166). Flanges 160, 162, 164, 166 extend from an interior (or first) surface 168 of bracket 124. First flange 160 and second flange 162 form a first clevis 170 configured to receive a first pin 172 (also referred to as a first restraint pin). First pin 172 may be a screw, a bolt, a rod, or similar structure configured to extend from first flange 160 to second flange 162. Third flange 164 and fourth flange 166 form a second clevis 174 configured to receive a second pin 176 (also referred to as a second restraint pin). Second pin 176 may be a screw, a bolt, a rod, or similar structure configured to extend from third flange 164 to fourth flange 166. In accordance with various embodiments, in the secured position, as shown in FIG. 3A, first tube portion 150a may be located in first clevis 170, such that first tube portion 150a is located between first flange 160 and second flange 162, and between interior surface 168 and first pin 172. In the secured position, second tube portion 150b may be located in second clevis 174, such that second tube portion 150b is located between third flange 164 and fourth flange 166, and between interior surface 168 and second pin 176.

Bracket 124 further includes a strap protrusion 180. Strap protrusion 180 extends from an exterior (or second) surface 182 of bracket 124 and defines opening 132. Exterior surface 182 is opposite and oriented away from interior surface 168.

Puller 128 includes a first puller flange 190 and a second puller flange 192. First and second puller flanges 190, 192 extend from an interior (or first) surface 194 of puller 128. In the secured position, interior surface 194 of puller 128 is oriented toward interior surface 168 of bracket 124. In this regard, first and second puller flanges 190, 192 extend toward interior surface 168 of bracket 124. In various embodiments, first flange 160, third flange 164, and interior surface 168 of bracket 124 define a first groove 196 configured to receive first puller flange 190. Second flange 162, fourth flange 166, and interior surface 168 of bracket 124 define a second groove 198 configured to receive second puller flange 192. In accordance with various embodiments, first and second puller flanges 190, 192 form a puller clevis 200 configured to receive a third pin 202 (also referred to as a third restraint pin). Third pin 202 may be a screw, a bolt, a rod, or similar structure configured to extend from first puller flange 190 to second puller flange 192. Puller 128 further includes a strap protrusion 204. Strap protrusion 204 extends from an exterior (or second) surface 206 of puller 128 and defines opening 136. Exterior surface 206 of puller 128 is opposite and oriented away from interior surface 194 of puller 128.

An interior end 210 of first tube portion 150a and an interior end 212 of second tube portion 150b may be located between first puller flange 190 and second puller flange 192. Interior end 212 of second tube portion 150b is configured to receive interior end 210 of first tube portion 150a. Third pin 202 may be located through interior end 210 of first tube portion 150a, interior end 212 of second tube portion 150b, and first and second puller flanges 190, 192. First tube portion 150a and second tube portion 150b may pivot about third pin 202. In this regard, first tube portion 150a and second tube portion 150b pivot relative to one another and relative to puller 128. Stated differently, first tube portion 150a and second tube portion 150b are pivotably coupled to one another and to puller 128.

Third pin 202 is also located through torsion spring 152. Torsion spring 152 is configured to apply a biasing force against first and second tube portions 150a, 150b. Torsion spring 152 applies a biasing force against first tube portion 150a in a first circumferential direction C1 (e.g., in a counterclockwise direction) about third pin 202. Torsion spring 152 also applies a biasing force against second tube portion 150b in a second circumferential direction C2 (e.g., a clockwise direction) about third pin 202.

Figure 4A:
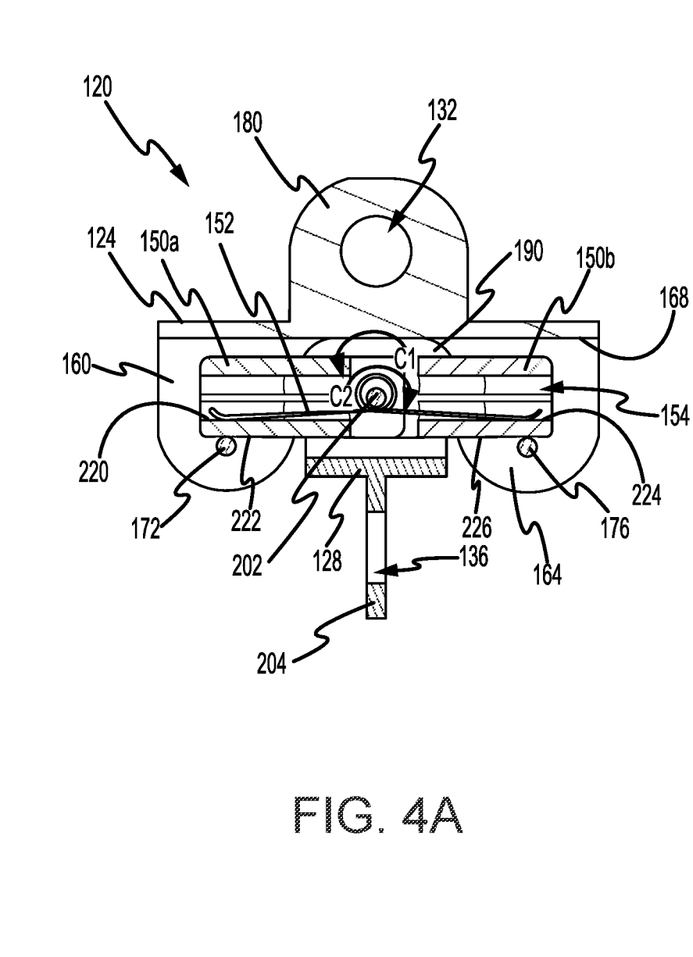
FIG. 4A illustrates a cross-section view of a releasable restraint in a secured position, taken along the line 4A-4A in FIG. 3A, in accordance with various embodiments.

With reference to FIG. 4A, a cross-section view of releasable restraint 120 taken along the line 4A-4A in FIG. 3A is shown. In FIG. 4A, releasable restraint 120 is in a secured position. In the secured position, first tube portion 150a is located between interior surface 168 of bracket 124 and first pin 172, and second tube portion 150b is located between interior surface 168 of bracket 124 and second pin 176. Torsion spring 152 applies a biasing force against an internal surface 220 of first tube portion 150a, thereby forcing first tube portion 150a in the first circumferential direction C1. The biasing force applied by torsion spring 152 may force an external surface 222 of first tube portion 150a into contact with first pin 172. First pin 172 generates an interference with first tube portion 150a, thereby limiting rotation of first tube portion 150a in first circumferential direction C1. Torsion spring 152 also applies a biasing force against an internal surface 224 of second tube portion 150b, thereby forcing second tube portion 150b in the second circumferential direction C2. The biasing force applied by torsion spring 152 may force an external surface 226 of second tube portion 150b into contact with second pin 176. Second pin 176 generates an interference with second tube portion 150b, thereby limiting rotation of second tube portion 150b in second circumferential direction C2. In the secured position, an angle theta (θ), with momentary reference to FIG. 4B, between external surface 222 of first tube portion 150a and external surface 226 of second tube portion 150b may be approximately 180°. As used in the previous context only, "approximately" means±5°.

Figure 4B:
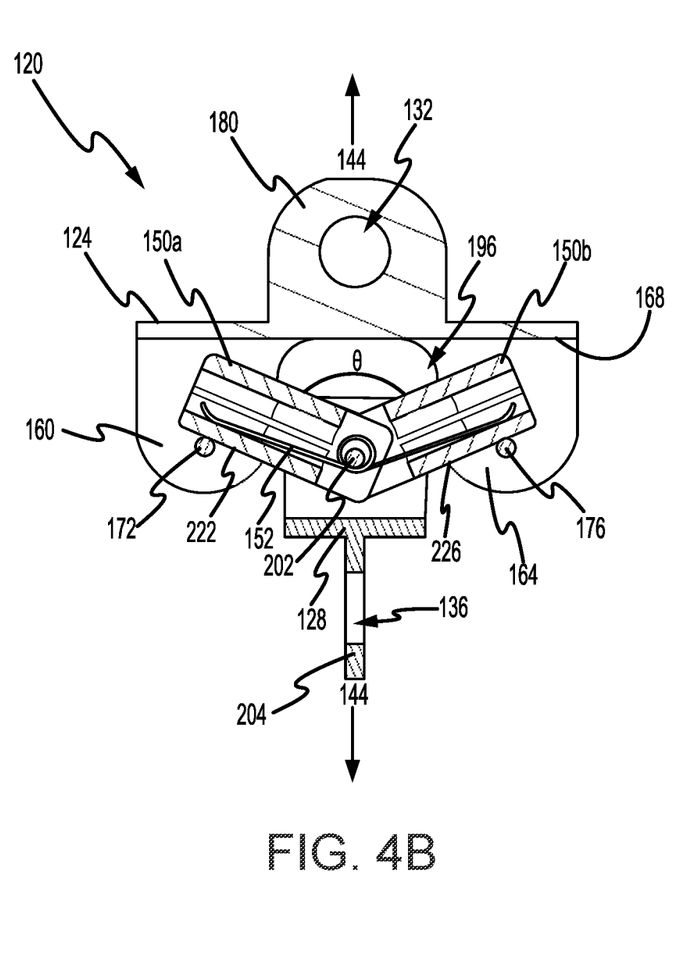
FIGS. 4B and 4C illustrate cross-section views of a releasable restraint during evacuation slide deployment, in accordance with various embodiments.

With reference to FIG. 4B, a cross-section view of releasable restraint 120 during evacuation slide deployment is illustrated. In response to deployment (i.e., inflation) of evacuation slide 100 (FIG. 1), first and second straps 122, 126 (FIG. 2B) apply force 144, in opposing directions, to releasable restraint 120. The force 144 is applied to bracket 124 via strap protrusion 180 and to puller 128 via strap protrusion 204. Puller 128 and bracket 124 translate away from one another, in response to force 144 exceeding the biasing force applied by torsion spring 152 to first and second tube portions 150a, 150b. In this regard, a distance between puller 128 and interior surface 168 of bracket 124 begins to increase in response force 144 exceeding the biasing force applied by torsion spring 152.

Third pin 202 translates with puller 128 and away from interior surface 168 of bracket 124. The translation of third pin 202 away from interior surface 168 of bracket 124, along with the interference between first pin 172 and first tube portion 150a and the interference between second pin 176 and second tube portion 150b, causes first and second tube portions 150a, 150b to rotate about third pin 202. For example, translation of third pin 202 away from interior surface 168 of bracket 124, along with the interference between first pin 172 and first tube portion 150a, causes first tube portion 150a to rotate about third pin 202 in second circumferential direction C2. Similarly, translation of third pin 202 away from interior surface 168 of bracket 124, along with the interference between second pin 176 and second tube portion 150b, causes second tube portion 150b to rotate about third pin 202 in first circumferential direction C1. The rotation of first tube portion 150a in second circumferential direction C2 and/or the rotation of second tube portion 150b in first circumferential direction C1 decreases the angle theta (θ) between first tube portion 150a and second tube portion 150b.

Figure 4C:
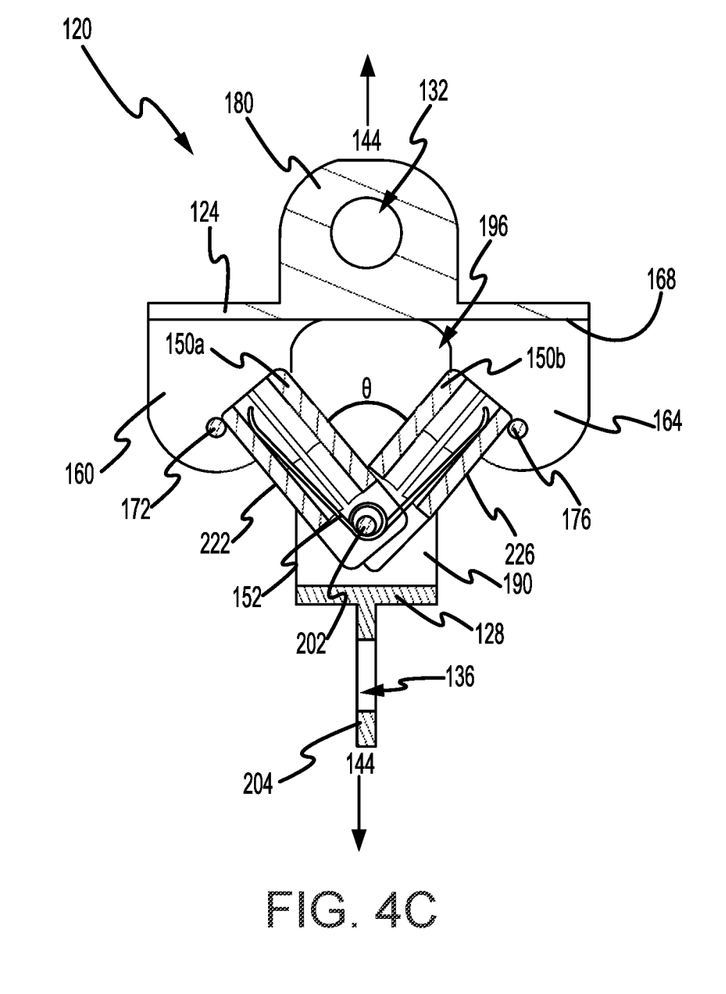

With reference to FIG. 4C, as the internal pressure within evacuation slide 100 continues to increase, the force 144 applied by first and second straps 122, 126 (FIG. 2B) increases, thereby further increasing the distance between puller 128 and bracket 124. First and second tube portions 150a, 150b continue to rotate in second circumferential direction C2 and first circumferential direction C1, respectively, and angle theta (θ) continues to decrease, until the interference between external surfaces 222, 226 and first and second pins 172, 176, is removed.

Figure 4D:
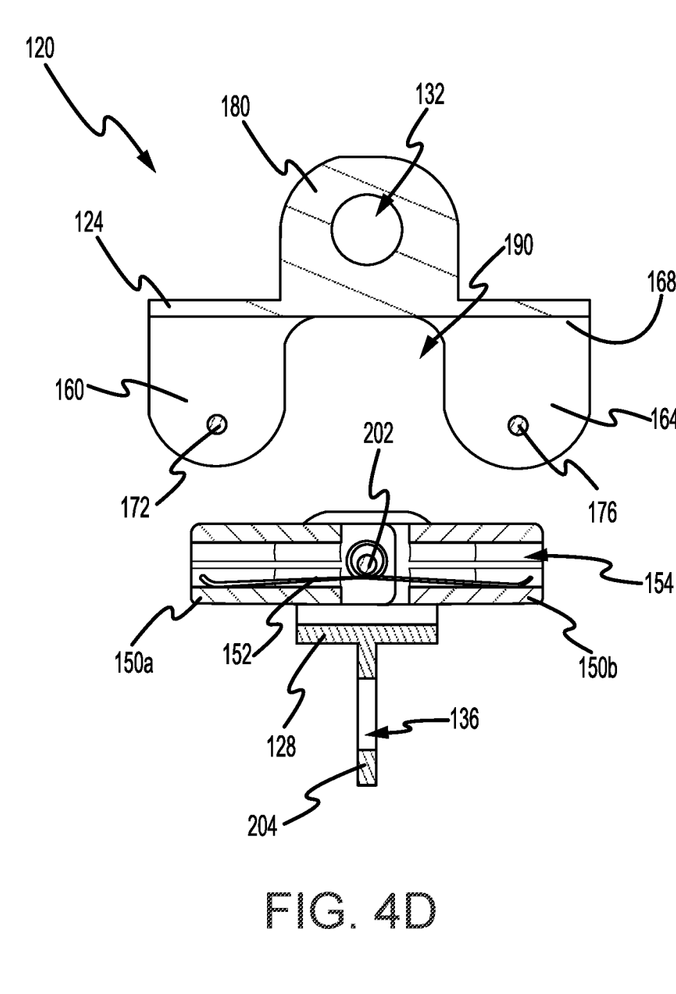
FIG. 4D illustrates a cross-section view of releasable restraint in a separated position, in accordance with various embodiments.

FIG. 4D illustrates a cross section view of releasable restraint 120 in a separated or released position. With combined reference to FIGS. 4C and 4D, in response to first tube portion 150a translating past (i.e., no longer contacting) first pin 172, the biasing force applied by torsion spring 152 forces first tube portion 150a to rotate in the first circumferential direction C1. In response to second tube portion 150b translating past (i.e., no longer contacting) second pin 176, the biasing force applied by torsion spring 152 forces second tube portion 150b to rotate in the second circumferential direction C2. In this regard, torsion spring 152 rotates first and second tube portion 150a, 150b in opposing circumferential direction about third pin, thereby causing the angle theta (θ) between first tube portion 150a and second tube portion 150b to increase. In various embodiments, torsion spring 152 may be configured such that, when torsion spring 152 is in a neutral position, angle theta (θ) will be approximately 180°. As used in the previous context only, "approximately" means±5°.

Releasable restraint 120 is configured such that puller 128 separates from bracket 124, in response to the internal slide pressure exceeding a predetermined threshold pressure. For example, the spring constant of torsion spring 152 and the distance between first pin 172 and second pin 176 are selected such that the interference between first and second tube portions 150a, 150b and first and second pins 172, 176 will be removed, when the internal slide pressure exceeds the predetermined threshold pressure. In this regard, increasing the spring constant and/or decreasing the distance between first pin 172 and second pin 176 increases the internal slide pressure associated with puller 128 separating from bracket 124.

Releasable restraint 120 employing torsion spring 152 along with first and second pins 172, 176 and rotatable first and second tube portions 150a, 150b to regulate the force associated with separation of releasable restraint 120 may allow for increased consistency with regard to releasable restraint 120 separating at a desired pressure. In this regard, releasable restraint 120 may allow for increased control of the deployment of evacuation slide 100 in FIGS. 1 and 2A. Further, employing puller 128, which resets after separation from bracket 124, allows releasable restraint 120 to be employed in subsequent evacuation slide deployments by reinserting puller 128 into bracket 124 to re-secure releasable restraint 120. In this regard, releasable restraint 120 is reusable. Reusing releasable restraint 120 may provide cost savings, particularly, with regard to slide testing and certification, wherein multiple deployments of evacuation slide 100 may be performed.

Figure 5A:
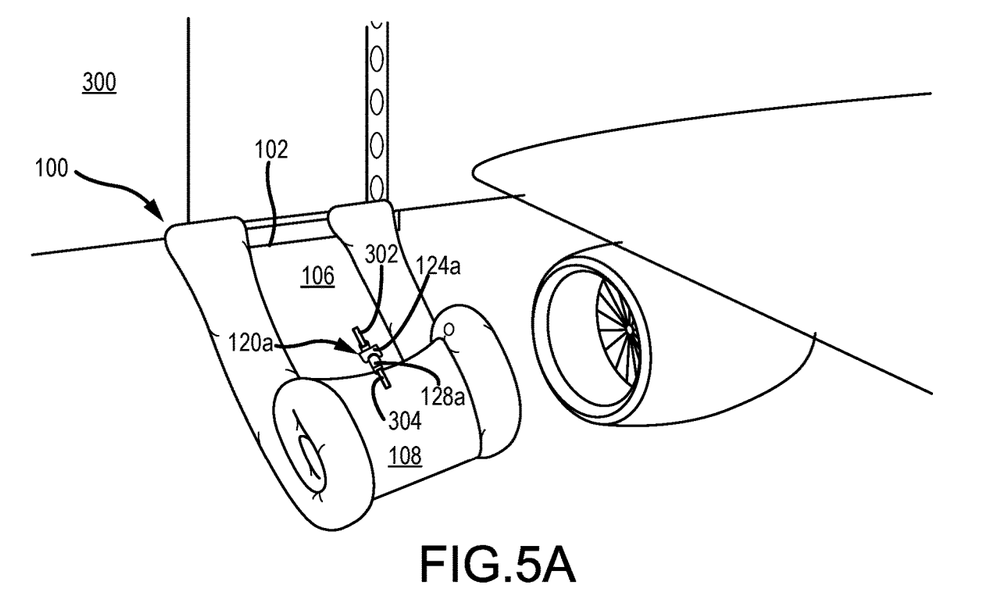
FIGS. 5A, 5B, and 5C illustrate a staged deployment of an evacuation slide, in accordance with various embodiments.
Figure 5B:
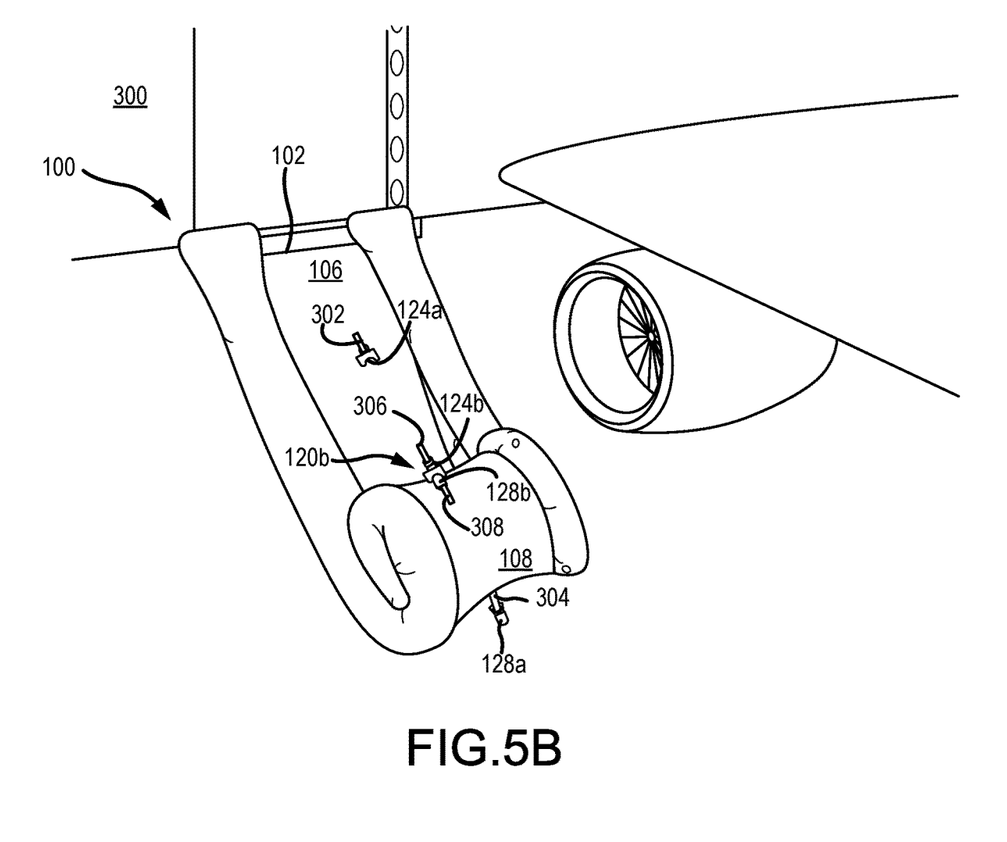
Figure 5C:
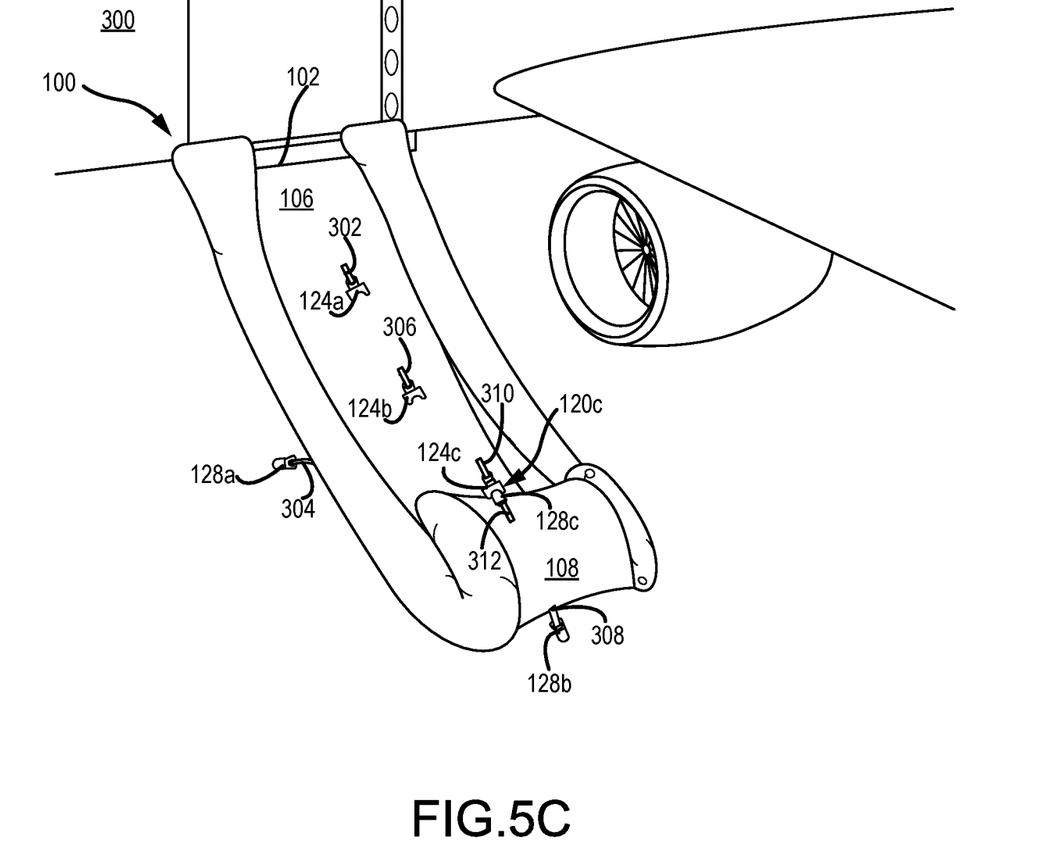

With reference to FIGS. 5A, 5B, and 5C, a staged deployment of evacuation slide 100 from an aircraft 300 is illustrated. With reference to FIG. 5A, a first stage of a deployment of evacuation slide 100 is illustrated, in accordance with various embodiments. A first (or initial) releasable restraint 120a may be coupled between a first strap 302 and a second strap 304. First strap 302 may be attached to a first bracket 124a of first releasable restraint 120a. Second strap 304 may be coupled to a first puller 128a of first releasable restraint 120a. In various embodiments, first strap 302 may be attached to sliding surface 106 and second strap 304 may be attached to underside surface 108. First releasable restraint 120a is configured to separate in response to an internal pressure of evacuation slide 100 exceeding a first threshold pressure.

With to reference to FIG. 5B, a second stage of deployment of evacuation slide 100 is illustrated, in accordance with various embodiments. In response to the internal pressure of evacuation slide 100 exceeding the first threshold pressure, first puller 128a separates from first bracket 124a, thereby allowing evacuation slide 100 to unfold. A second releasable restraint 120b may be coupled between a third strap 306 and a fourth strap 308. Third strap 306 may be attached to a second bracket 124b of second releasable restraint 120b. Fourth strap 308 may be coupled to a second puller 128b of second releasable restraint 120b. In various embodiments, third strap 306 may be attached to sliding surface 106 and fourth strap 308 may be attached to underside surface 108. In various embodiments, first strap 302 may be located closer to head end 102 as compared to third strap 306. Second releasable restraint 120b may be configured to separate in response to an internal pressure of evacuation slide 100 exceeding a second threshold pressure.

In various embodiments, the second threshold pressure may be greater than the first threshold pressure. Stated differently, the threshold pressure associated with separating second releasable restraint 120b may be greater than the threshold pressure associated with separating first releasable restraint 120a. First and second releasable restraints 120a, 120b may each include a torsion spring, first and second tube portions, and first and second pins, similar to torsion spring 152, first and second tube portions 150a, 150b, and first and second pins 172, 176, respectively, in FIG. 3B. In various embodiments, a spring constant of the torsion spring in second releasable restraint 120b may greater than the spring constant of the torsion spring in first releasable restraint 120a. In various embodiments, a distance between the first and second pins of second releasable restraint 120b may be less than a distance between the first and second pins of first releasable restraint 120a.

With to reference to FIG. 5C, a third stage of deployment of evacuation slide 100 is illustrated, in accordance with various embodiments. In response to the internal pressure of evacuation slide 100 exceeding the second threshold pressure, second puller 128b separates from second bracket 124b, thereby allowing evacuation slide 100 to further unfold. In various embodiments, a third releasable restraint 120c may be coupled between a fifth strap 310 and a sixth strap 312. Fifth strap 310 may be attached to a third bracket 124c of third releasable restraint 120c. Sixth strap 312 may be coupled to a third puller 128c of third releasable restraint 120c. In various embodiments, fifth strap 310 may be attached to sliding surface 106 and sixth strap 312 may be attached to underside surface 108. In various embodiments, first strap 302 and/or third strap 306 may be located closer to head end 102 as compared to fifth strap 310.

Third releasable restraint 120c may be configured to separate in response to an internal pressure of evacuation slide 100 exceeding a third threshold pressure. The third threshold pressure may be greater than the second threshold pressure. Third releasable restraint 120c may include a torsion spring, first and second tube portions, and first and second pins, similar to torsion spring 152, first and second tube portions 150a, 150b, and first and second pins 172, 176, respectively, in FIG. 3B. In various embodiments, a spring constant of the torsion spring in third releasable restraint 120c may be greater than the spring constant of the torsion spring in second releasable restraint 120b. In various embodiments, a distance between the first and second pins of third releasable restraint 120c may be less than a distance between the first and second pins of second releasable restraint 120b.

Releasable restraints 120a, 120b, 120c employing torsions springs, rotating first and second tube portions, and first and second pins to regulate the force associated with separation of the releasable restraint may allow for increased consistency with regard to the releasable restraints separating at the desired pressures. In this regard, in addition to being reusable, releasable restraints 120a, 120b, 120c may allow for increased control of the deployment of evacuation slide 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A releasable restraint, comprising:
   a bracket;
   a first pin extending between a first flange of the bracket and a second flange of the bracket;
   a second pin extending between a third flange of the bracket and a fourth flange of the bracket;
   a puller removably coupled to the bracket;
   a first tube portion rotatably coupled to the puller;
   a second tube portion rotatably coupled to the puller;
   a torsion spring configured to bias the first tube portion toward the first pin and to bias the second tube portion toward the second pin; and
   a third pin coupled to the puller;
   wherein the first tube portion and the second tube portion are configured to rotate about the third pin;
   wherein the torsion spring is configured to bias the first tube portion in a first circumferential direction about the third pin, and wherein the torsion spring is configured to bias the second tube portion in a second circumferential direction about the third pin, the second circumferential direction being opposite the first circumferential direction;
   wherein the puller includes a first puller flange extending from an interior surface of the puller and a second puller flange extending from the interior surface of the puller, and wherein the third pin extends between the first puller flange and the second puller flange; and
   wherein in a secured position, the first puller flange is located in a first groove defined by the first flange, the third flange, and an interior surface of the bracket, and wherein in the secured position, the second puller flange is located in a second groove defined by the second flange, the fourth flange, and the interior surface of the bracket.

2. The releasable restraint of claim 1, wherein the torsion spring is located in a spring channel defined by the first tube portion and the second tube portion.

3. The releasable restraint of claim 2, wherein an interior end of the second tube portion is configured to receive an interior end of the first tube portion, and wherein the third pin is located through the interior end of the first tube portion and the interior end of the second tube portion.

4. An evacuation slide, comprising:
   a sliding surface;
   an underside surface opposite the sliding surface;
   a first strap coupled to at least one of the sliding surface or the underside surface;
   a second strap coupled to at least one of the sliding surface or the underside surface;
   a first releasable restraint coupled between the first strap and the second strap, the first releasable restraint comprising:
      a first bracket coupled to the first strap;
      a first pin extending between a first flange of the first bracket and a second flange of the first bracket;
      a second pin extending between a third flange of the first bracket and a fourth flange of the first bracket;
      a first puller coupled to the second strap;
      a first tube portion rotatably coupled to the first puller; and
      a second tube portion rotatably coupled to the first puller;
   a third strap coupled to at least one of the sliding surface or the underside surface;
   a fourth strap coupled to at least one of the sliding surface or the underside surface; and
   a second releasable restraint coupled between the third strap and the fourth strap, the second releasable restraint comprising:
      a second bracket coupled to the third strap;
      a first restraint pin extending between a first flange of the second bracket and a second flange of the second bracket;
      a second restraint pin extending between a third flange of the second bracket and a fourth flange of the second bracket;
      a second puller coupled to the fourth strap;
      a first restraint tube portion rotatably coupled to the second puller; and
      a second restraint tube portion rotatably coupled to the second puller;
   wherein the first releasable restraint further comprises a first torsion spring configured to bias the first tube portion of the first releasable restraint toward the first pin of the first releasable restraint, and wherein the first torsion spring is configured to bias the second tube portion of the first releasable restraint toward the second pin of the first releasable restraint;
   wherein the second releasable restraint further comprises a second torsion spring configured to bias the first restraint tube portion of the second releasable restraint toward the first restraint pin of the second releasable restraint, and wherein the second torsion spring is configured to bias the second restraint tube portion of the second releasable restraint toward the second restraint pin of the second releasable restraint; and
   wherein a distance between the first pin of the first releasable restraint and the second pin of the first releasable restraint is less than a distance between the first restraint pin of the second releasable restraint and the second restraint pin of the second releasable restraint.

5. The evacuation slide of claim 4, wherein the first releasable restraint further comprises a third pin coupled to the first puller, the first tube portion and the second tube portion being configured to rotate about the third pin.

6. The evacuation slide of claim 4, wherein a spring constant of the second torsion spring is greater than a spring constant of the first torsion spring.

7. The evacuation slide of claim 6, wherein the first strap is coupled closer to a head end of the evacuation slide as compared to the third strap.

* * * * *